April 14, 1953  W. P. TAYLOR, JR  2,634,916
WINDING Filed July 5, 1949  6 Sheets-Sheet 1

INVENTOR
WALTER P. TAYLOR, JR.
BY
Bailey, Stephens & Huettig
ATTORNEYS

April 14, 1953 W. P. TAYLOR, JR 2,634,916
WINDING

Filed July 5, 1949 6 Sheets-Sheet 2

INVENTOR
WALTER P. TAYLOR, JR.
BY Bailey, Stephens & Huettig
ATTORNEYS

Fig. 8.

April 14, 1953  W. P. TAYLOR, JR  2,634,916
WINDING

Filed July 5, 1949  6 Sheets-Sheet 4

INVENTOR
WALTER P. TAYLOR, JR.
BY
Bailey, Stephens+Huettig
ATTORNEYS

April 14, 1953 W. P. TAYLOR, JR 2,634,916
WINDING
Filed July 5, 1949 6 Sheets-Sheet 5

INVENTOR
WALTER P. TAYLOR, JR
BY
Bailey, Stephens & Huettig
ATTORNEYS

Patented Apr. 14, 1953

2,634,916

UNITED STATES PATENT OFFICE 2,634,916

WINDING

Walter P. Taylor, Jr., New York, N. Y.

Application July 5, 1949, Serial No. 103,086

7 Claims. (Cl. 242—2)

The invention relates to winding, and more especially to the winding of flexible materials such as wire and yarn. It contemplates both a machine for producing wound coils of flexible material and the coils so produced.

In the past, efforts have been made to produce coils or balls of flexible materials from which the material could be withdrawn without kinking or snarling. All previous solutions to this problem have been complicated and generally unsatisfactory. The primary object of the present invention is to provide a new type of coil which is easy to make, and from which wire, yarn or the like can be withdrawn readily and without danger of kinking.

I am aware that some flexible materials have heretofore been wound in a series of figures 8's, but in every case the supplies of material so formed have been laid flat, that is, with the opposing bights of each length in substantially the same plane. Such a winding is bulky, it is hard to handle because it is not self-supporting, and is slow and expensive to produce. The present invention, in contrast, contemplates a coil formed of a series of figure 8 or multiplex figure 8 lengths, which is compact and generally spherical, and which is largely self-supporting. For this purpose, the coil is made up of windings in the form of lengths each forming a figure 8 or a multiplex figure 8, with the opposite loops or bights wound into sections that lie in planes which form angles of not more than about 90 degrees with each other.

A further object of the invention is to produce a coil of this type which can be wound easily and economically, and to provide a machine for the production of such a coil which is easy to construct and simple in operation.

It is difficult with present types of machinery to produce long lengths of a flexible material in a form in which they can be readily handled. Another object of the present invention is to provide a machine which will wind a series of connected coils of the type contemplated, so that pieces of great length can be produced from which the material can be drawn without kinking. The machines for obtaining this result are simple in construction and easy to operate.

Still another object of the invention is to produce a coil from which the wire or other material is withdrawn between the free ends of the two central loops of a series of figure 8 windings, and from the interior of the coil. This arrangement simplifies the production of the coil, and makes it easier to withdrawn the wire from it.

An additional object of the invention is to produce a coil formed of a series of lengths each constituted by a figure 8 or multiplex figure 8, in which the crossing points of successive windings progress around the axis of the coil, so that the coil is substantially symmetrical around this axis. Such an arrangement is especially desirable in connection with large, heavy coils, since it makes them easier to roll over the ground when no conveyance is available for carrying them.

In winding yarn for weaving, the centrifugal force caused by the spinning action of the outgoing line, as it comes off the usual type of winding, puts a definite limit on the speed at which the yarn can be pulled off without breakage or damage. A further object of this invention is to provide a practical winding for yarn that will allow it to be pulled from the winding without appreciable back pull due to centrifugal force.

Further objects and advantages of the invention will appear more fully from the following description, especially when taken in conjunction with the accompanying drawings, which form a part thereof.

The coil shown in Figs. 1 to 4 is composed of a series of lengths each forming a single figure 8. The cross-overs of these lengths substantially overlie each other. One length may for example consist of two bights 2 and 4, crossing each other at 6. The coil is of course made up of a series of such lengths, wound one upon the next. It will be noted that the planes in which the opposite bights 2 and 4 lie are oblique to each other, these planes being indicated by lines 3—10 and 8—12 respectively, and that the angle between these planes is less than 90 degrees. In actual practice, the cross-overs do not stay exactly on top of each other, but instead slide off to the sides so as to form a somewhat irregular pattern at the rear of the coil. Nevertheless, the coil is substantially narrower in the rear than in the front.

The free end 14 of the coil is brought out between the free ends of the bights, a space being maintained in the coil at this point for this purpose. With such an arrangement, successive bights of the coil as it is wound receive opposite twists. When the material is withdrawn from the interior of the coil through the space between the bights, these successive reversed twists counteract each other and the material can be withdrawn without twist or kink.

When resilient material is wound in such a coil, it is ordinarily sufficiently self-supporting without any assistance. However, in order to prevent accidental separation of the coils, it may be desirable to place one or more strips of some adhesive tape partly around the coil, as indicated at 16 in Fig. 2.

Figure 1:
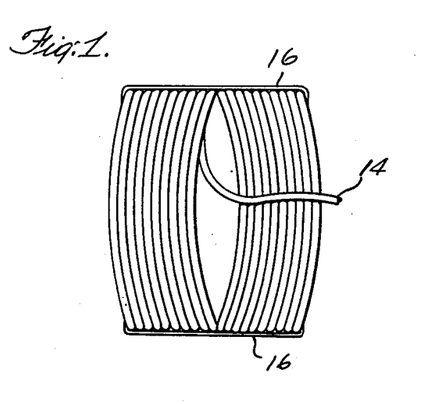
Fig. 1 is a front view of a form of coil embodying one form fo my invention and composed of windings each in the form of a figure 8.
Figure 2:
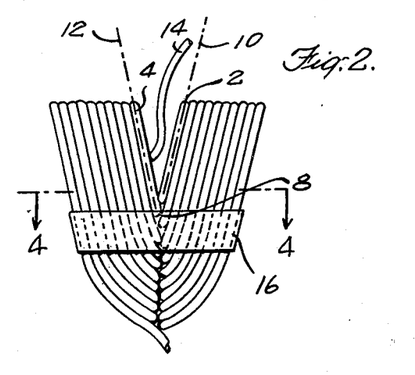
Figs. 2 and 3 are a top view and a rear view respectively of the coil shown in Fig. 1.
Figure 3:
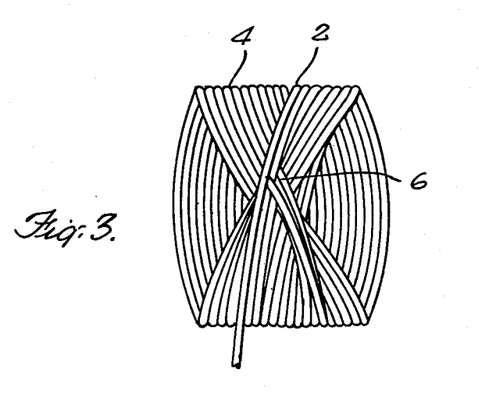
Figure 4:
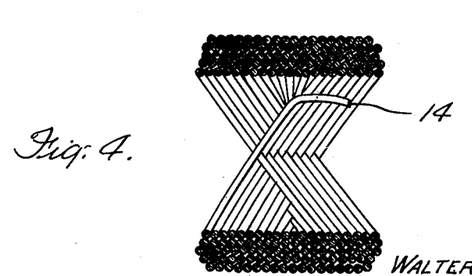
Fig. 4 is a cross-section on the line 4—4 of Fig. 2.
Figure 5:
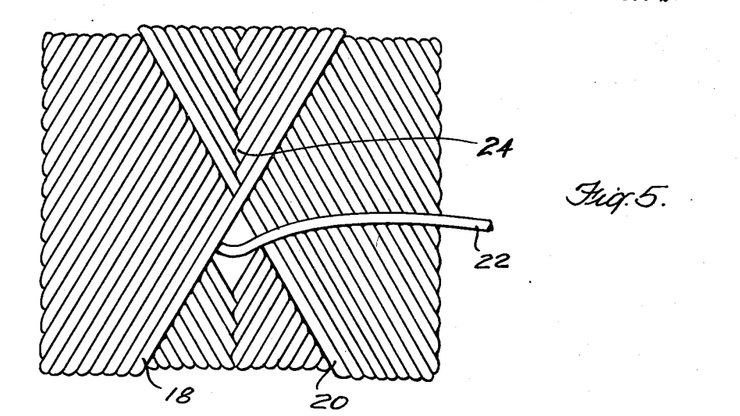
Figs. 5, 6 and 7 are a front view, a top view and a rear view, respectively, of a modified form of coil similarly composed but having its crossing points successively displaced around the coil axis.
Figure 6:
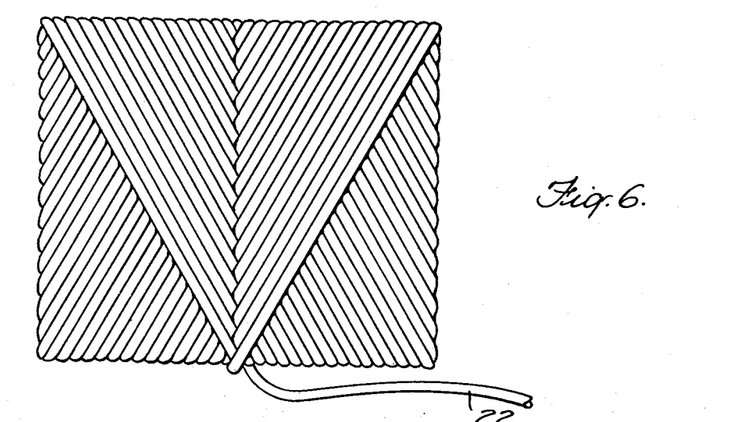
Figure 7:
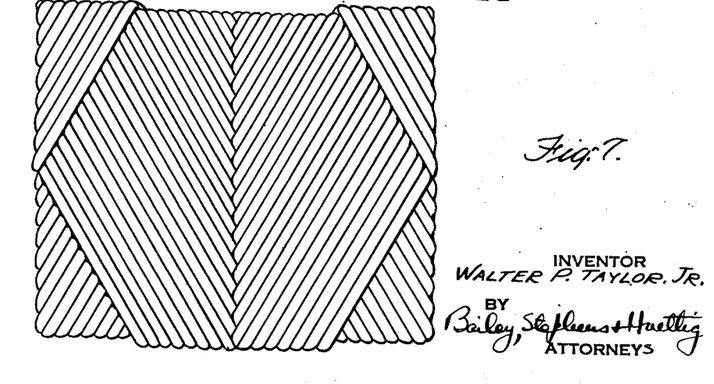

Coils of the type shown in Figs. 1 to 4 are satisfactory for most purposes, especially when they are not too large and heavy. However, they cannot be rolled along the ground very easily, because of their unsymmetrical shape. For large, heavy coils which may be taken where vehicles are unavailable, and which therefore must be capable of being rolled, the form of coil shown in Figs. 5 to 7 is preferred. This may also be preferable for light coils because of the ease with which cylinders can be fitted to standard packages.

In this form, as in the one previously described, the coil is formed of a series of lengths each composed of a figure 8. One of these lengths is indicated by the two bights 18, 20, which are arranged in planes forming an angle of less than 90 degrees with each other. The free end 22 is brought out between the ends of the bights, through a space maintained for that purpose, for the withdrawal of material from the coil.

However, instead of having the cross-overs at the same point, this form of coil has successive cross-overs progressively shifted around the axis of the coil, so that the coil is substantially a cylinder symmetrical about the coil axis. Such a coil is easy to roll, and is in addition entirely self-supporting. The cross-overs are indicated for example at 24 in Fig. 5. The shifting of cross-overs can be progressively forward or progressively backward, a positive wind or a negative wind.

Both forms of coil have an opening through them, such opening extending through the opposed bights of the figure 8's. These openings are not used to receive holders, but must be unobstructed to permit proper withdrawal of the material. No holders are needed as the coils may remain stationary, without revolution, while being unwound.

Figs. 8 to 13 show a machine for winding the coils previously described. This machine comprises essentially a shaft or spindle mounted for rotation, and provided with an extending divider, with means for shifting the flexible material being wound on the spindle from one side to the other of the spindle after a prescribed number of revolutions of the shaft.

Figure 8:
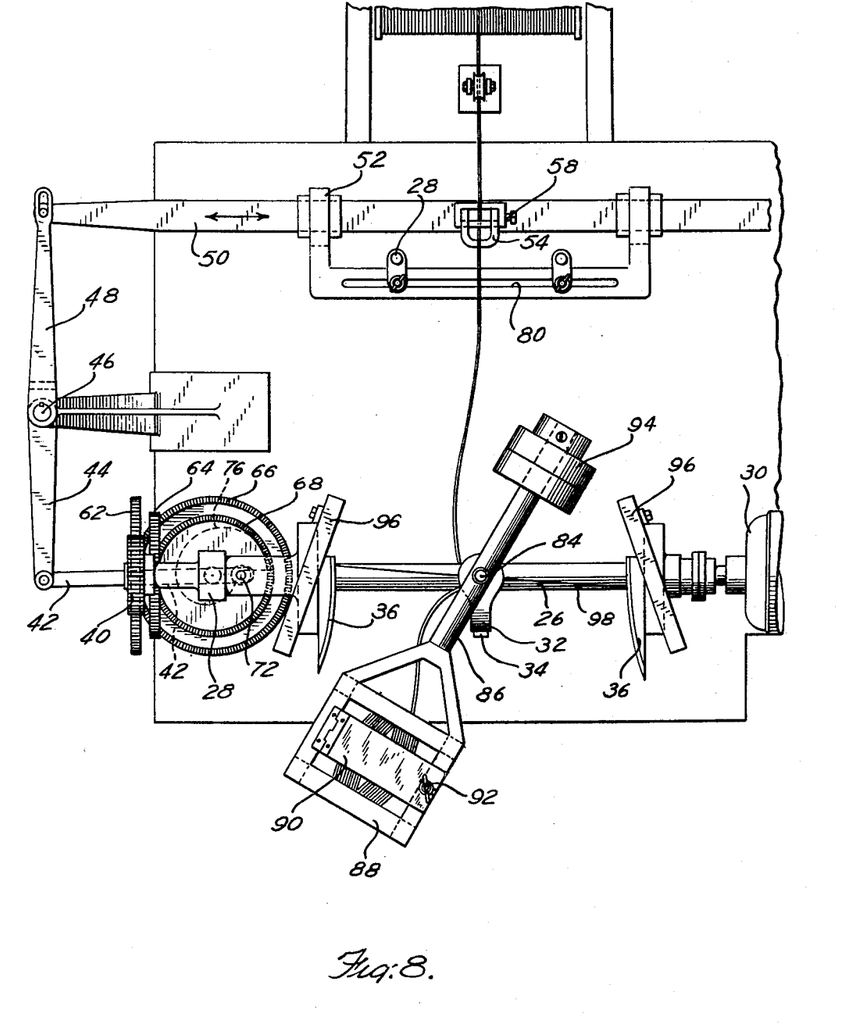
Fig. 8 shows in top plan view a machine for producing coils of the types shown in Figs. 1 to 7.
Figure 9:
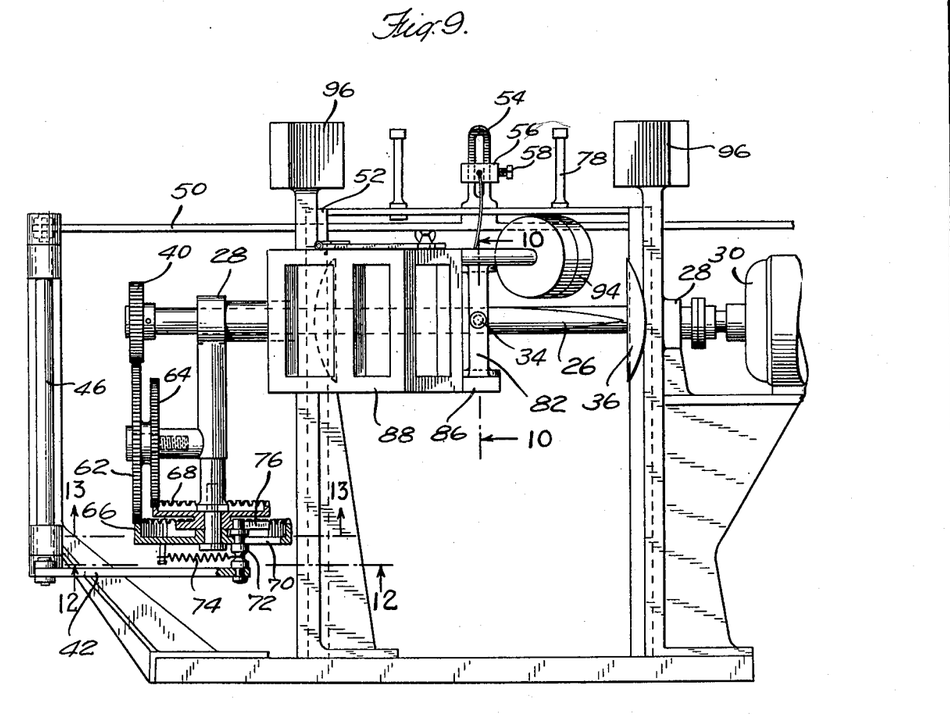
Fig. 9 is a rear view of this machine.
Figure 10:
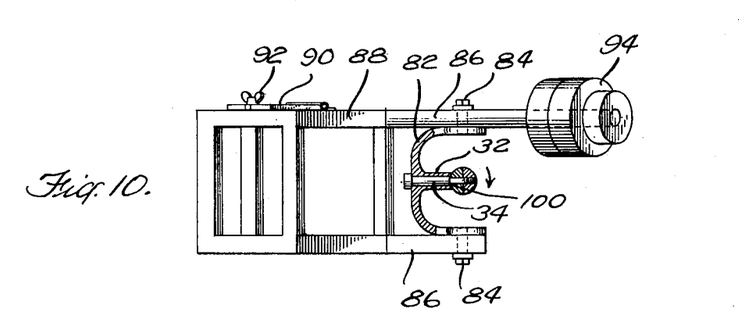
Fig. 10 is a cross-section on the line 10—10 of Fig. 9.
Figure 11:
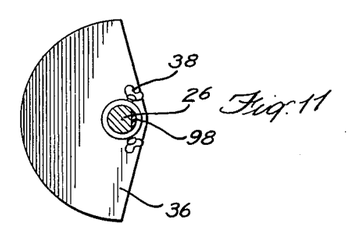
Fig. 11 shows in side elevation one of the end plates of the machine.
Figure 12:
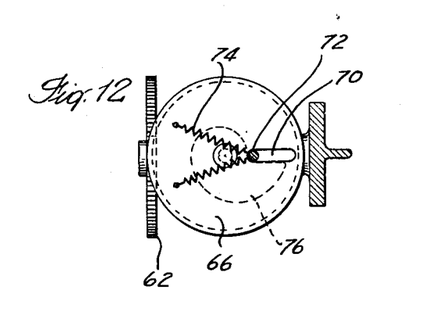
Figs. 12 and 13 are cross-sections on the lines 12—12 and 13—13 respectively of Fig. 9.
Figure 13:
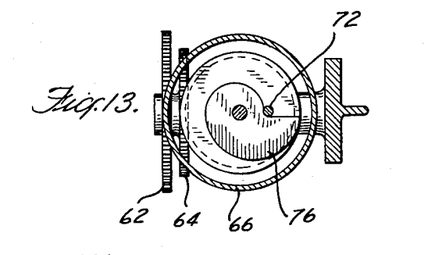

Figs. 8 and 9 show a spindle 26 mounted for rotation in bearings 28 of the machine frame, and driven in any suitable manner, as by a motor 30. The details of this spindle will be described below. Carried by the spindle and extending radially therefrom is a divider 32 which is removable from the spindle, for example being secured to it by a bolt 34 whose head rests against the end of the divider and which is threaded in the spindle. The type of divider shown in Fig. 10 is used when a number of coils are to be wound in series, in a way to be described, but simpler forms, of which examples are disclosed hereinafter, may be used. Spindle 26 is also provided with removable end plates 36 shown in Fig. 11, which are secured on the spindle by wing nuts 38. These end plates limit the spreading of the coil and aid in making it flat-sided and compact.

Mounted on one end of the spindle is a gear 40 which, through suitable gearing, causes reciprocation of a link 42 connected at its end to a lever 44 fixed on shaft 46. A second lever 48 on shaft 46 is connected by a pin and slot to a slide 50 arranged in guides 52 on the frame. This slide carries a guiding member composed of a slotted upright 54 on which is adjustably mounted an element 56 having a hole through it in alignment with the slot in the sliding guide, and capable of being fixed in an adjusted position on the guide by set screw 58.

Figure 14:
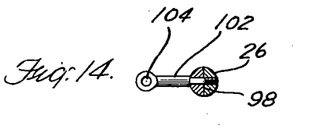
Fig. 14 shows in cross-section a form of divider for use when single coils are to be formed.

The parts of the machine heretofore described represent the machine according to the invention in a very simple form, and their operation will be described before the remainder of the device is discussed. It will be shown later that the gearing shown has a special function, but is not essential to the broader aspects of the invention, and that the carrier arrangement shown in Fig. 10 is only required when a connected series of coils is to be wound. In the following discussion, the machine should be considered as if the divider or projection 32 of Fig. 10 were a simple radial pin (Fig. 14).

Assuming that a supply of a flexible material such as wire is supplied from the reel 60, this wire is led through the hole in element 56 and is secured to the divider 32. The motor is then operated to rotate the spindle and winds the wire on it. At each revolution of the spindle, the slide 50 moves from one end of its path to the other, so that the wire which has been on the left hand side, for example, of the divider during one revolution of the spindle will be on the right hand side during the next revolution. The divider moves through the part of its travel on the side nearest the source of supply when the guide 54 is at one of the ends of its path. As a result, at each revolution, a bight is formed around the spindle lying on one side of the divider, and at the next revolution a similar bight is formed on the opposite side. The crossing points are on the side opposite the divider in the simplest form of the winding. Since such materials are generally somewhat slippery, the successive coils will tend to slip laterally on each other, until they are stopped by the end pieces 36, after which they will overlie each other to form a coil. This coil will be of the form shown in Figs. 1 to 4.

The gearing arrangement shown in Figs. 8, 9, 12 and 13 is provided so as to vary the travel of the guide 54 and thus to spread the successive coils along the spindle. Gear 40 drives a gear 62 which is rigid with a somewhat smaller gear 64 on the same shaft. These two gears engage concentric crown gears 66, 68 respectively. The web of gear 66 has in it a radial slot 70 in which slides a pin 72 the lower end of which is secured in link 42. Two springs 74 connected to this pin and to the gear web tend to hold the pin close to the axis of the gear. Rigid with gear 68 is a cam 76 which engages the top end of pin 72.

This arrangement operates in the following manner: When the parts are in the position shown in Fig. 13, at each revolution of the spindle the guide 54 moves through only a small distance since the pin 72 turns around its least radius. As the winding proceeds, the difference between the number of teeth on gears 62 and 64 causes gear 68 to turn slightly faster than gear 66 so that cam 76 gradually turns with respect to pin 72. This slowly forces the pin outwardly in its slot and thus increases its radius of rotation and the travel of guide 54. Finally, the outer end of the cam comes opposite the pin and it is released and pulled inward by spring 74 to its original position. In this way, the travel of the guide increases at each rotation until a layer of bights or coils has been laid across the spindle, and the guide is then restored to its original place and another layer is laid.

In some circumstances, it may be desirable to limit the travel of the wire to an amount less than the travel of the guide. For this purpose, adjustable posts 78 slidable along a slot 80 between the guide 54 and the spindle are provided. These posts will be engaged by the wire and will thus limit the spread of the coils on the spindle to the space between the posts even though the travel of the guide may be greater than this space.

One great advantage of the coils produced according to the invention is that a series of such coils may be wound connected together so that the material may be withdrawn from them successively in an unbroken line. For winding such coils, it is necessary that the coils already wound be carried around with the starting end of the coil being wound, of course without interfering with its winding. For this purpose, the carrier for such coils is mounted directly on the divider. As shown in Figs. 8 to 10, the divider 32 has arms 82 having at their ends pins 84 on which are pivoted carrier frame members 86. These frame members support a carrier composed of a suitable box of light construction for holding previously wound coils, indicated at 88. A closure 90 is hinged on the carrier and controlled by a latch 92. One of the frame members extends across the spindle to receive counterweights 94.

Fixedly mounted on the frame above the spindle 26 are two guiding plates 96 arranged in vertical planes inclined towards the source of supply.

This arrangement operates as follows:

Assume that the parts start in the position shown in Fig. 8, with guide 54 moving towards the left, and that the spindle rotates in the direction indicated by the arrow in Fig. 10. During the first quarter rotation of the spindle, the carrier will move towards the left of Fig. 8. If the carrier continued to turn in the position shown, it would in the next quarter turn engage the wire and thus interfere with the winding. At the end of this first quarter turn, however, the carrier engages the guiding plate 96 and is shifted to the right. The momentum of the carrier, when it meets this obstacle, is sufficient to carry it across to its furthermost position to the right. During the second quarter turn, the carrier moves through its position nearest the guide 54, but at the right hand side of the drawing, while the guide has moved to its position farthest to the left. During the next two quarter turns, the carrier moves to the angular position shown in Fig. 8 with respect to the spindle axis, but shifted to the right. During this period, guide 54 moves back to its central position. During the next quarter turn, guide 54 moves towards the right from its middle position. At the end of this period, carrier 88 engages the right hand guiding plate 96' and is shifted to the left. During the sixth quarter turn, carrier 88 moves around to the position nearest the guide 54, but shifted to the left, while the guide is in its most right hand position. During the next two quarter turns, the parts return to the original position shown in Fig. 8, and the same steps are repeated.

After one full coil has been wound, the bolt 34 is removed and the divider 32 is pulled out of the opening which it has formed in the coil, care being taken however to keep the free end of the wire from the interior of the coil extending out through the hole. The spindle is pulled out of the finished coil, and this coil is then placed inside the carrier, and winding is resumed without cutting the wire, until another coil has been wound and can likewise be placed in the carrier. This can be repeated as often as desired, depending on the unbroken length desired. Thus a series of connected coils is produced. When wire is withdrawn from the first coil until it is exhausted, the outer end of this coil goes into the opening of the next, and the coils can be drawn off one after the other until the wire is exhausted without kinking or tangling, without the use of reels or other holding equipment, and without rotation.

In order to make the removal of the spindle from the wound coil easier, it is preferably split along a diagonal line 98. The two parts have aligned holes as shown in Fig. 10, the bolt 34 having a shoulder 100 which engages the nearer half of the spindle, through which it passes freely, while it is threaded into the further half of the spindle. Thus the two parts are held tightly together during winding, but may be easily pulled apart endwise out of the finished coil as soon as the divider is removed.

The coil of Figs. 5 to 7 can be wound on the same machine. All that is necessary for this purpose is to change the ratio of the gears 62, 64, 66, 68 so that the guide 54 makes slightly more than, or slightly less than one complete reciprocation during each two turns of the spindle. This results in spacing the successive crossovers angularly around the coil.

When only a single coil is to be wound, a divider of the type shown in Fig. 14 can be used. This is a simple pin 102 with a hole 104 in its free end for holding the starting end of the wire. The pin is secured to the spindle in the same manner as the bolt 34 described above.

Figure 15:
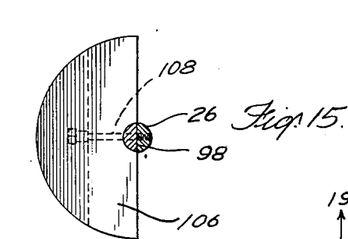
Fig. 15 shows another type of divider, in elevation.
Figure 16:
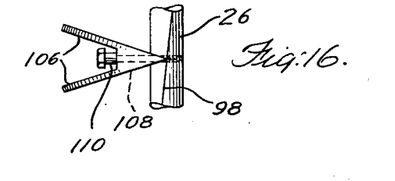
Fig. 16 is a top plan view of the divider of Fig. 15.

Figs. 15 and 16 show still another form of divider. This is formed of two semicircular plates 106 arranged at a small angle to each other and with a block 108 fixed between them. A bolt 110 has an enlarged portion near its head which rests against this block, and its other end is threaded in the further half of the spindle 26. This will produce an opening of considerable angular extent in the finished coil through which the wire is withdrawn.

Figure 17:
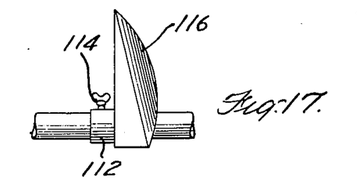
Fig. 17 shows in top plan view a modified form of end plate.

Fig. 17 shows an end plate which may be used for producing coils of special shape. This plate has a part 112 to be secured on the spindle by set screw 114, and a body portion 116. The body portion is in the shape of a portion of a sphere, with its convexity inwardly directed towards the coil. A coil wound when such an end piece is used will have its outer layers wider than its inner layers, and with certain types of material will be more substantial when so formed.

Figure 18:
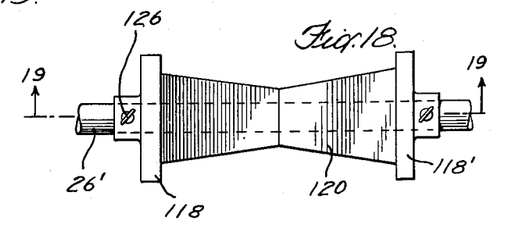
Fig. 18 is a side elevation of a spindle for winding flat materials such as tapes.
Figure 19:
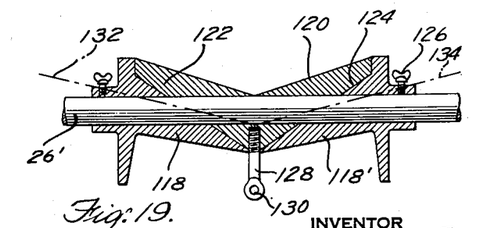
Fig. 19 is a cross-section on the line 19—19 of Fig. 18.

For winding flat flexible material, such as metal strip, rubber tape, ribbon or the like, I prefer to use a special spindle of the type shown in Figs. 18 and 19. This is composed of three parts secured removably on a main spindle 26' which is operated in the same manner as spindle 26. The three parts 118, 118' and 120 are separated along diagonal lines 112, 124 to permit easy removal from the finished coil. The outer parts 118, 118' are secured on the spindle by set screws 126, and hold part 120 between them. Divider 128 is removably mounted in the central part 120, and has an eye 130 to which the material to be wound can be secured.

The three parts are shaped to have a complete outside surface of special shape. This is composed of two parts each of generally circular cross-section, but with their axes inclined to each other and to the axis of the spindle. These axes are indicated at 132 and 134 in Fig. 19. Thus, when flat material is wound, it forms a coil in general similar to that of Figs. 1 to 4, that is, one in which each length is formed of a figure 8 with the planes of the successive bights forming angles of less than 90 degrees with each other.

Preferably, to form a more substantial coil and to make for easier removal of the spindle from the finished coil, the two parts of the spindle are not of uniform diameter throughout, but have a diameter which increases from the center outward as shown in Fig. 18.

Figures 20, 24:
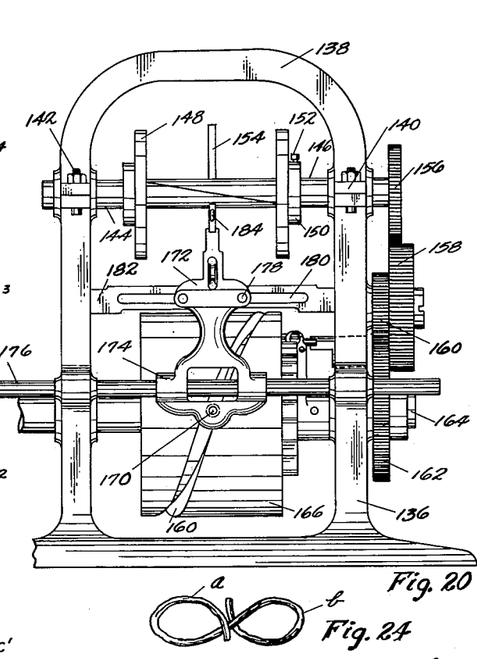
Fig. 20 shows in side elevation a machine for producing a coil according to the invention in which each winding is composed of multiplex figure 8's.
Figs. 24 and 25 are explanatory diagrams.
Figure 21:
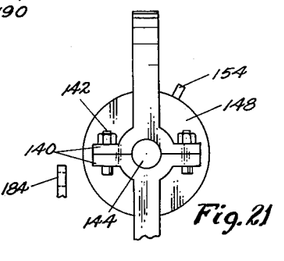
Fig. 21 is an end view of the top part of this machine.
Figure 22:
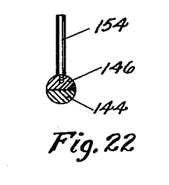
Fig. 22 is a cross-section through the center of the spindle.
Figure 25:
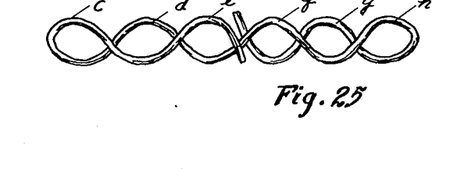

The machine shown in Fig. 20, is intended to produce a coil having multiplex figure 8 windings in each layer. The term "multiplex figure 8" is intended to designate windings in which there are two or more crossing loops on each side of the central point, rather than only one loop as in a normal figure 8. Fig. 24 shows a normal figure 8, having bights $a$ and $b$. Fig. 25 shows a multiplex figure 8, having loops $c$, $d$, $e$ on one side of the center and loops $f$, $g$, $h$ on the other side. The machine in general is of a well known type, and as shown is similar to that disclosed in the Wardwell Patent 480,157. It includes a frame 136 having a removable upper part 138 secured to the main frame by flanges 140 and bolts 142 (see Fig. 21). The two frame parts hold between them the spindle which differs from that of the Wardwell patent referred to. The spindle is formed of two parts, 144, 146, divided centrally along a slanting line. The two parts are held together by flanges 148 having collars 150 provided with set screws 152. A projection or pin 154 is threaded at the center into member 146.

The remainder of the machine is similar to that of the Wardwell patent. Shaft section 146 carries a gear 156 driven by gears 158, 160 and 162 from shaft 164. Shaft 164 carries a drum 166 having a spiral slot 168 in its periphery. In this slot engages a pin 170 rigid with frame 172 slidable by collars 174 on rod 176. The frame is further guided by pins 178 engaged in slot 180 in cage 182. Frame 172 has an extension in which is located an eye 184 for the flexible material to be wound. By this device, the flexible material is shifted from one side to the other of the central pin after each three revolutions of the spindle, plus or minus a few degrees, the ratio being changeable through changes in the gearing.

Figure 23:
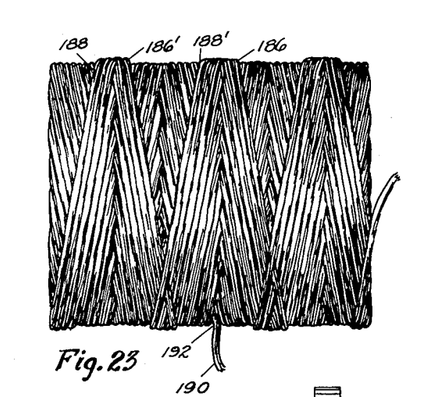
Fig. 23 shows a coil produced by this machine.

With such a device, there is produced a winding of the type shown in Fig. 23, in this case the fraction being plus. This is composed of figure 8's each of which has two multiplex bights which lie on either side of hole 192, one bight beginning where line 186 crosses the plane of the hole, continuing through 186' and returning through 188 and 188' to end where 186 began. The free end 190 of the roll is brought out through space 192 formed by the pin 154 during the formation of the coil, this space being located at the longitudinal center of the coil. As the free end is withdrawn, successive multiplex figure 8's from the center of the core such as are shown in Fig. 25 are pulled out so that the twist in one bight (composed of three loops) is compensated by that in the next bight, and the whole arrangement in general is similar to that shown in the preceding figures.

Figure 26:
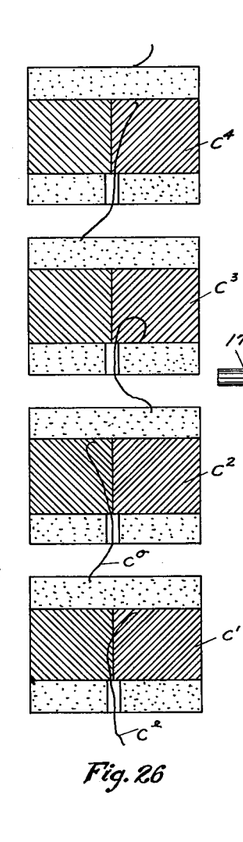
Fig. 26 shows a connected series of packages.

Fig. 26 shows a connected series of packages which may be produced on the machine of Figs. 8 to 13. This machine will first produce the coil or package $c^1$, the inner end $c^e$ of which is held at the pin 34. When this coil has been wound, it is removed and placed in the carrier 88, the outer end $c^o$ being then held at the pin. Package $c^2$ is then wound and placed on the carrier, then packages $c^3$ and $c^4$. It will be noted that the outer end $c^o$ of each package extends through the radial hole or opening into the interior of the next package, and has as its continuation the inner end of the material of such next package.

When the material is to be used, inner end $c^e$ of package $c^1$ is withdrawn, until package $c^1$ is exhausted. The material of package $c^2$ will then be withdrawn, and then that of packages $c^3$ and $c^4$. During all this withdrawal, there is no rotation of the packages, and no kinking or snarling of the material.

The words "small number" in the phrase "after a predetermined small number of revolutions" is intended to include the number one as well as small numbers greater than one.

The invention thus produces a coil from which the material can be withdrawn without any rotation being necessary and still without twist or kinking resulting in the running line. This not only simplifies the paying out of the material but leaves both ends usable so that, if the material be hose or electric wire, it can be in use while being paid out or while still in the coil without the addition of extra connectors such as slip rings or packed joints.

In addition, a coil of the type described herein offers substantially no resistance to the withdrawal of the material, so that it can be paid out without requiring the use of any heavy pull on the free end. Also, since the coil does not rotate as the material is paid out, there is almost no momentum developed such as might cause back-lash, and no braking means, like those required when drums are used, are needed.

This application is a continuation-in-part of my application Serial Number 693,441, filed August 28, 1946.

Further advantages of the invention will be readily apparent from the foregoing description, and various modifications will readily occur to anyone skilled in the art. Therefore, while I have described herein some embodiments of my invention, I wish it to be clearly understood that I do not intend to limit myself thereby except within the scope of the claims hereto or hereinafter appended.

I claim:

1. A machine for winding flexible material into a coil, comprising a spindle, means to rotate said spindle, said spindle having a projection therefrom, means to hold a supply of flexible material, means to cause such relative movement between said material from such supply and the spindle as to cause said material after a predetermined small number of revolutions of the spindle to shift from side to side of said projection, whereby to wind said material on the spindle in the form of a series of lengths each forming at least one figure 8, and a carrier for wound coils mounted on said projection to turn with respect thereto about an axis generally radial to the spindle axis adjacent said projection.

2. A machine for winding flexible material into a coil, comprising a spindle, means to rotate said spindle, said spindle having a projection therefrom, means to hold a supply of flexible material, means to cause such relative movement between the spindle and material from such supply as to cause the material after a predetermined small number of revolutions of the spindle to shift from side to side of said projection, whereby to wind said material on the spindle in the form of a series of lengths each forming at least one figure 8, a carrier for wound coils mounted on said projection to turn with respect thereto about an axis generally radial to the spindle axis adjacent said projection, and means to shift said carrier to keep it on the side of the projection opposite the side on which material is being fed to the spindle.

3. A machine for winding flexible material into a coil, comprising a spindle, means to rotate said spindle, said spindle having a projection therefrom, means to hold a supply of flexible material, means to guide material from said supply to the spindle, said guiding means causing the material to shift from one side to the other of said projection at each revolution of the spindle, whereby to wind the material on the spindle in a series of lengths each forming a figure 8, and a carrier for wound coils pivoted on said projection to turn with respect to the spindle about an axis generally radial to the axis of the spindle.

4. A machine for winding flexible material into a coil, comprising a spindle, means to rotate said spindle, said spindle having a projection therefrom, means to hold a supply of flexible material, means to guide material from said supply to the spindle, said means causing the material to shift from side to side of said projection after a predetermined small number of revolutions of the spindle, whereby to wind the material on the spindle in a series of lengths each forming at least one figure 8, a carrier for wound coils pivoted on said projection to turn with respect to the spindle about an axis generally radial to the axis of the spindle, and means to shift said carrier to keep it on the side of the projection opposite the side on which material is being fed to the spindle.

5. In a machine as claimed in claim 4, said projection and carrier being removable from the spindle.

6. A machine for winding flexible material into a coil, comprising a spindle, means to rotate said spindle, said spindle having a projection therefrom, means to hold a supply of flexible material, means to guide material from such supply to the spindle, said guiding means causing the material to shift from one side to the other of the projection at each revolution of the spindle, whereby to wind the material on the spindle in a series of lengths each forming a figure 8, an arm pivoted on said projection to turn with respect thereto about an axis generally radial to the axis of the spindle, and extending to one side of the spindle, a carrier for wound coils on said arm, and cam members in the path of said carrier as it rotates with the spindle to engage the carrier and shift it at each revolution of the spindle to the side of the projection opposite the side on which material is being fed to the spindle.

7. In a machine as claimed in claim 6, said projection and carrier being removable from the spindle.

WALTER P. TAYLOR, Jr.

References Cited in the file of this patent

UNITED STATES PATENTS

| Number | Name | Date |
| --- | --- | --- |
| 302,461 | Worchester | July 22, 1884 |
| 579,054 | Garsed | Mar. 16, 1897 |
| 753,344 | Witham | Mar. 1, 1904 |
| 954,344 | Rhoades | Apr. 5, 1910 |
| 963,114 | Berry | July 5, 1910 |
| 1,281,861 | Sibley | Oct. 15, 1918 |
| 1,592,432 | Barry | July 13, 1926 |
| 2,082,489 | Goldsmith | June 1, 1937 |
| 2,095,765 | Schenck | Oct. 12, 1937 |
| 2,231,092 | Schenck | Feb. 11, 1941 |
| 2,310,071 | Frisch | Feb. 2, 1943 |
| 2,360,909 | Swanson | Oct. 24, 1944 |
| 2,513,815 | Nelson | July 4, 1950 |
| 2,608,354 | Whittaker | Aug. 26, 1952 |

FOREIGN PATENTS

| Number | Country | Date |
| --- | --- | --- |
| 54,956 | Denmark | July 11, 1938 |
| 85,289 | Germany | Feb. 24, 1896 |
| 90,552 | Germany | Feb. 16, 1897 |